United States Patent

Fukuoka et al.

Patent Number: 5,357,118
Date of Patent: Oct. 18, 1994

[54] RATIATION IMAGE READ-OUT APPARATUS, RADIATION IMAGE RECORDING METHOD AND APPARATUS, STIMULABLE PHOSPHOR SHEET, AND CASSETTE

[75] Inventors: Takayoshi Fukuoka, Tokyo; Satoshi Arakawa, Kanagawa; Ikuo Mori, Tokyo, all of Japan

[73] Assignee: Fuji Photo Film Co., Ltd., Kanagawa, Japan

[21] Appl. No.: 222,528

[22] Filed: Apr. 4, 1994

Related U.S. Application Data

[60] Division of Ser. No. 5,866, Jan. 15, 1993, which is a continuation of Ser. No. 546,503, Aug. 8, 1990, abandoned.

[30] Foreign Application Priority Data

| Aug. 10, 1989 | [JP] | Japan | 1-207357 |
| Sep. 5, 1989 | [JP] | Japan | 1-230199 |
| Sep. 11, 1989 | [JP] | Japan | 1-235329 |

[51] Int. Cl.$^5$ .............. G01N 23/04; G03G 5/16
[52] U.S. Cl. ................. 250/582; 250/581; 250/588
[58] Field of Search ........... 250/581, 582, 583, 586, 250/484.4, 486.1, 487.1, 588, 589

[56] References Cited

U.S. PATENT DOCUMENTS

| 4,258,264 | 3/1981 | Kotera et al. |
| 4,276,473 | 6/1981 | Kato et al. |
| 4,315,318 | 2/1982 | Kato et al. |
| 4,387,428 | 6/1983 | Ishida et al. |
| 4,394,581 | 7/1983 | Takahashi et al. ............ 250/581 |
| 4,491,736 | 1/1985 | Teraoka ........................ 250/581 |
| 4,575,635 | 3/1986 | Arakawa et al. |
| 4,829,181 | 5/1989 | Shimura |
| 4,864,134 | 9/1989 | Hosoi et al. |
| 4,868,857 | 9/1989 | Dobbins, III |
| 4,922,105 | 5/1990 | Hosoi |
| 4,950,907 | 8/1990 | Kuhn ............................ 250/586 |
| 4,982,098 | 1/1991 | Yokota et al. |
| 5,038,037 | 8/1991 | Saotome ....................... 250/583 |

FOREIGN PATENT DOCUMENTS

| 56-11395 | 1/1981 | Japan |
| 56-73400 | 6/1981 | Japan |
| 63-214700 | 9/1988 | Japan |

*Primary Examiner*—Paul M. Dzierzynski
*Assistant Examiner*—Drew A. Dunn
*Attorney, Agent, or Firm*—Sughrue, Mion, Zinn, Macpeak & Seas

[57] ABSTRACT

In a radiation image read-out apparatus, a phosphor sheet (70), represented by the formula $Gd_2O_2S:Tb^{3+}$, is located facing a stimulable phosphor sheet (10) in such a manner that when it is exposed to x-rays (44) it produces fluorescence (71) having a wavelength that fall within the stimulation wavelength range of the stimulable phosphor. When the stimulable phosphor sheet (10) is exposed to the fluorescence (71), part of the energy stored on the layer of stimulable phosphor during its exposure to the x-rays (44) is released. In this manner, the stimulable phosphor sheet (10) is approximately simultaneously subjected to the operation for recording the radiation image and the operation for slightly erasing the energy store thereon during its exposure to the x-rays (44).

20 Claims, 12 Drawing Sheets

F I G. 12
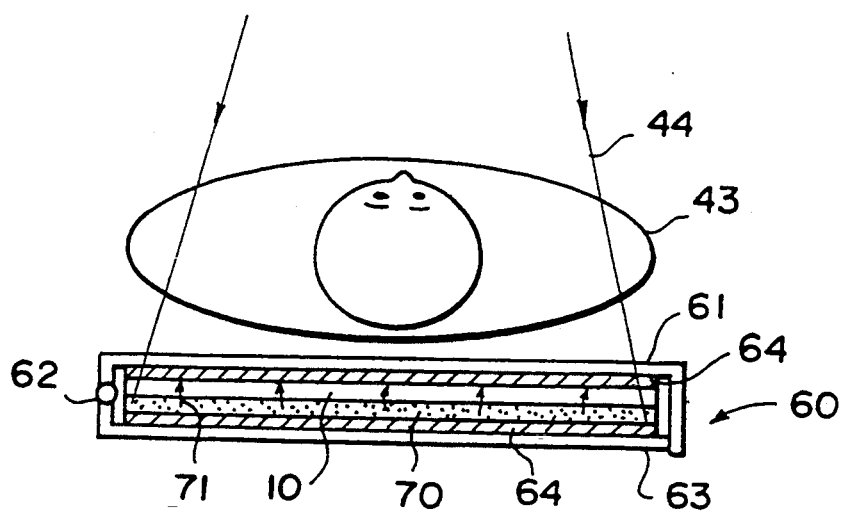
F I G. 13
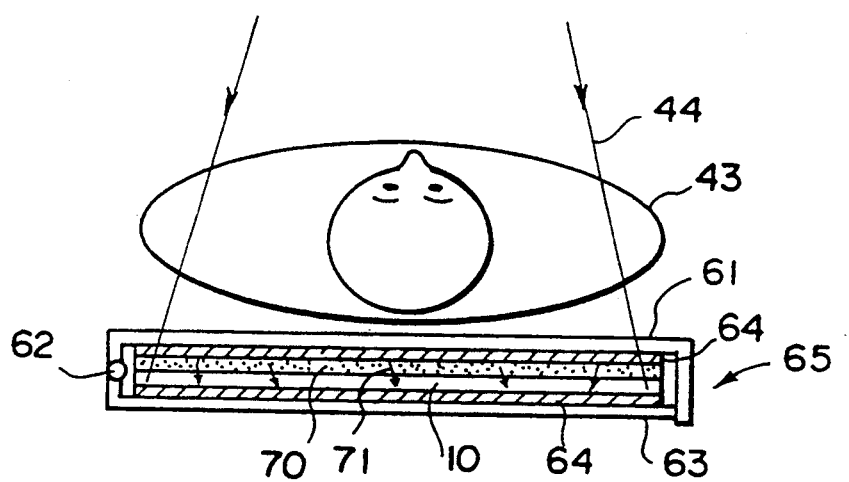

RATIATION IMAGE READ-OUT APPARATUS, RADIATION IMAGE RECORDING METHOD AND APPARATUS, STIMULABLE PHOSPHOR SHEET, AND CASSETTE

This is a divisional of application No. 08/005,866 filed Jan. 15, 1993, which is a continuation of application No. 07/564,503 filed on Aug. 8, 1990 now abandoned.

BACKGROUND OF THE INVENTION

1. Field of the Invention

This invention relates to a radiation image read-out apparatus wherein a stimulable phosphor sheet, on which a radiation image of an object has been stored, is exposed to stimulating rays, which cause the stimulable phosphor sheet to emit light in proportion to the amount of energy stored thereon during its exposure to radiation, and the emitted light is photoelectrically detected and converted into an image signal representing the radiation image. This invention also relates to a method for recording a radiation image on a stimulable phosphor sheet such that the range of the amount of light emitted by the stimulable phosphor sheet, on which a radiation image has been stored, can be compressed, and an apparatus for carrying out the method. This invention further relates to a stimulable phosphor sheet, which is used in the radiation image recording method and apparatus, and a cassette which houses the stimulable phosphor sheet.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as a human body. In this manner, a radiation image of the object is stored on the stimulable phosphor sheet. The stimulable phosphor sheet, on which the radiation image has been stored, is then scanned with stimulating rays which cause it to emit light in proportion to the amount of energy stored thereon during its exposure to the radiation. The light emitted by the stimulable phosphor sheet, upon stimulation thereof, is photoelectrically detected and converted into an electric image signal. The electric image signal is then processed as desired. The processed image signal is used during the reproduction of a visible image which has good image quality and can serve as an effective tool in, particularly, the efficient and accurate diagnosis of an illness. The visible image finally obtained may be reproduced as a hard copy or may be displayed on a cathode ray tube (CRT).

The radiation image recording and reproducing systems described above are applicable not only to medical diagnoses but also to detection of flaws in industrial products. Specifically, a radiation image of an industrial product, such as a round bar or a steel pipe, may be stored on a stimulable phosphor sheet and may then be reproduced as a visible image in the manner described above. In the visible image, even a flaw, which is present at a position deep from the surface of the industrial product, appears clearly as a pattern darker than the surrounding areas because of its lower radiation absorptivity.

Industrial metal products, such as round bars, pipes (e.g. steel pipes), and die steel products, have markedly higher radiation absorptivity than human bodies, or the like. Therefore, when a radiation image of such an industrial product is to be stored on a stimulable phosphor sheet, it is necessary for the industrial product to be exposed to a markedly higher dose of radiation than when a radiation image of a human body, or the like, is to be recorded. As a result, the amount of energy stored on the stimulable phosphor sheet during its exposure to the radiation differ markedly for the region corresponding to the part of the industrial product having a comparatively high radiation absorptivity and for the region corresponding to the part of the industrial product having a comparatively low radiation absorptivity.

When the radiation image of an industrial product is read out from the stimulable phosphor sheet, the dynamic range of the amount of light emitted by the stimulable phosphor sheet often becomes wider than $10^4$. However, the read-out range of a photoelectric read-out means, such as a photomultiplier, i.e. the range of the amount of light, which range the photoelectric read-out means can detect, is ordinarily approximately $10^2$, and is at most approximately $10^4$. Therefore, an ordinary photoelectric read-out means cannot accurately detect such a wide range of the amount of light emitted by the stimulable phosphor sheet. Even when a photoelectric read-out means is used which can detect such a wide range of the amount of light emitted by the stimulable phosphor sheet, because the wide range of the amount of emitted light must be detected, the change in the amount of emitted light per bit becomes large during A/D conversion of an image signal. Therefore, a small change in contrast cannot be detected easily. In general, the depth of a flaw occurring in a steep pipe, or the like, is very small, and therefore the difference between the flawed part and the surrounding parts in the radiation absorptivity is very small. In such cases, if a read-out image signal is obtained with a low contrast resolution, a difference between the flawed part and the surrounding parts in image density cannot be found easily in a visible radiation image reproduced from the read-out image signal.

The problems described above can be eliminated by compressing the range of the amount of light emitted by the stimulable phosphor sheet. For this purpose, a specific stimulable phosphor sheet may be used which is disclosed in, for example, Japanese Unexamined Patent Publication No. 63(1988)-214700, and whose sensitivity to radiation varies locally in accordance with the radiation absorptivity characteristics of an object. However, such a specific stimulable phosphor sheet is applicable to only a specific object and is difficult to manufacture. Therefore, the disclosed technique is not suitable for practical use.

SUMMARY OF THE INVENTION

The primary object of the present invention is to provide a radiation image read-out apparatus which yields a read-out image signal such that part of an object, for example, a flawed part of an industrial product, having a radiation absorptivity slightly different from the surrounding parts can be accurately discriminated from the surrounding parts, and which is suitable for practical use.

Another object of the present invention is to provide a radiation image recording method which is easy to carry out and wherein a radiation image is recorded on a stimulable phosphor sheet such that the range of the amount of light emitted by the stimulable phosphor sheet, on which the radiation image has been stored, can be compressed.

A further object of the present invention, is to provide an apparatus for carrying out the radiation image recording method.

A still further object of the present invention is to provide a stimulable phosphor sheet, which is used in the radiation image recording method.

The specific object of the present invention is to provide a cassette which houses the stimulable phosphor sheet.

The first radiation image read-out apparatus is based on the findings that, basically, the radiation absorptivity of an object, such as a round bar or a steel pipe, is distributed with predetermined characteristics.

Specifically, the present invention provides a first radiation image read-out apparatus for exposing a stimulable phosphor sheet, which has been exposed to radiation which has passed through an object whose radiation absorptivity is basically distributed with predetermined characteristics, to stimulating rays which cause the stimulable phosphor sheet to emit light in proportion to the amount of energy stored thereon during its exposure to the radiation, detecting the light, which is emitted by the portion of the stimulable phosphor sheet exposed to the stimulating rays, with a photoelectric read-out means, and thereby obtaining an image signal representing a radiation image of the object, wherein the improvement comprises the provision of an optical filter which is located between said stimulable phosphor sheet and said photoelectric read-out means such that the position of said optical filter corresponds to the position of the radiation image of said object stored on said stimulable phosphor sheet, the transmittance of said optical filter with respect to the light emitted by said stimulable phosphor sheet being distributed such that a basic difference in the radiation absorptivity of said object is compensated for.

With the first radiation image read-out apparatus in accordance with the present invention, a basic difference in the radiation absorptivity of the object is accurately compensated for by the optical filter. Therefore, the intensity of light, which was emitted by the stimulable phosphor sheet and which has passed through the optical filter, distributes in an approximately flat pattern regardless of how the radiation absorptivity of the object is distributed. In cases where the purpose of the read-out operation is not to find the intrinsic shape of the object, or the like, but is to detect, for example, a flaw in the object, no problem occurs when the intensity of light, which was emitted by the stimulable phosphor sheet and which enters the photoelectric read-out means, distributes in an approximately flat pattern. The light, which has passed through the optical filter and which thus extends over a narrow dynamic range, is then detected by the photoelectric read-out means. During the detection, the read-out range of the photoelectric read-out means can be utilized broadly. Therefore, even a small difference in the amount of light emitted by the stimulable phosphor sheet, which difference is caused to occur by a flawed part of the object, or the like, can be enlarged and converted into a large difference in the image signal value. Accordingly, a visible image, in which a pattern of a flaw in the object, or the like, is illustrated clearly, can be reproduced from the image signal.

The present invention also provides a second radiation image read-out apparatus for exposing a stimulable phosphor sheet, which has been exposed to radiation which has passed through an object whose radiation absorptivity is basically distributed with predetermined characteristics, to stimulating rays which cause the stimulable phosphor sheet to emit light in proportion to the amount of energy stored thereon during its exposure to the radiation, detecting the light, which is emitted by the portion of the stimulable phosphor sheet exposed to the stimulating rays, with a photoelectric read-out means, and thereby obtaining an image signal representing a radiation image of the object, wherein the improvement comprises the provision of a signal correction means which corrects said image signal with a correction signal having the characteristics that compensate for a basic difference in the radiation absorptivity of said object.

With the second radiation image read-out apparatus in accordance with the present invention, a basic difference in the radiation absorptivity of the object is accurately compensated for by the signal correction means. Therefore, the level of the image signal, which has been corrected by the signal correction means, distributes in an approximately flat pattern regardless of how the radiation absorptivity of the object is distributed. In cases where the purpose of the read-out operation is not to find the intrinsic shape of the object, or the like, but is to detect, for example, a flaw in the object, no problem occurs when the level of the corrected image signal distributes in an approximately flat pattern. Also, in cases where the level of the corrected image signal distributes in an approximately flat pattern, a flaw in the object, or the like can be detected easily. The corrected image signal, which extends over a narrow dynamic range, should preferably be subjected to processing for enhancing the contrast. As a result, even a small difference in the level of the image signal, which difference is caused to occur by a flawed part of the object, or the like, can be enlarged. Accordingly, a visible image, in which a pattern of a flaw in the object, or the like, is illustrated clearly, can be reproduced from the image signal.

The present invention further provides a radiation image recording method wherein a stimulable phosphor sheet provided with a layer of a stimulable phosphor is exposed to radiation, which carries information about an image, and the image is thereby stored on the stimulable phosphor sheet, said stimulable phosphor exhibiting such properties that, when it is exposed to radiation and is then exposed to stimulating rays, it emits light in proportion to the amount of energy stored thereon during its exposure to the radiation, the radiation image recording method comprising the steps of:

i) locating a layer of a phosphor such that it faces the layer of said stimulable phosphor, said phosphor exhibiting such properties that, when it is exposed to the radiation, it produces the fluorescence having wavelengths falling within the stimulation wavelength range of said stimulable phosphor, and ii) thereafter irradiating the radiation to said stimulable phosphor sheet.

The present invention still further provides a radiation image recording apparatus in which a stimulable phosphor sheet provided with a layer of a stimulable phosphor is exposed to radiation, which carries information about an image, and the image is thereby stored on the stimulable phosphor sheet, said stimulable phosphor exhibiting such properties that, when it is exposed to radiation and is then exposed to stimulating rays, it emits light in proportion to the amount of energy stored thereon during its exposure to the radiation, wherein the improvement comprises the provision of a member, which is provided with a layer of a phosphor and which is located such that the layer of said phosphor is close to or in close contact with said stimulable phosphor sheet located at the position that is exposed to the radiation, said phosphor exhibiting such properties that, when it is exposed to the radiation, it produces the fluorescence having wavelengths falling within the stimulation wavelength range of said stimulable phosphor.

The present invention also provides a stimulable phosphor sheet provided with a layer of a stimulable phosphor which exhibits such properties that, when it is exposed to radiation and is then exposed to stimulating rays, it emits light in proportion to the amount of energy stored thereon during its exposure to the radiation, wherein the improvement comprises the provision of a layer of a phosphor, which is located such that it faces the layer of said stimulable phosphor and which exhibits such properties that, when it is exposed to the radiation, it produces the fluorescence having wavelengths falling within the stimulation wavelength range of said stimulable phosphor.

By way of example, the phosphor which produces the fluorescence may be dispersed in a binder, which is used to hold the stimulable phosphor on a sheet-like substrate. Alternatively, the layer of the phosphor may be formed independently of the stimulable phosphor layer and located so that it is close to or in close contact with the stimulable phosphor layer.

The present invention further provides a cassette for housing a stimulable phosphor sheet provided with a layer of a stimulable phosphor which exhibits such properties that, when it is exposed to radiation and is then exposed to stimulating rays, it emits light in proportion to the amount of energy stored thereon during its exposure to the radiation, wherein the improvement comprises the provision of a layer of a phosphor, which is located such that it faces the surface of said stimulable phosphor sheet housed in said cassette, said phosphor exhibiting such properties that, when it is exposed to the radiation, it produces the fluorescence having wavelengths falling within the stimulation wavelength range of said stimulable phosphor.

With the radiation image recording method in accordance with the present invention, when the stimulable phosphor sheet is exposed to radiation, the stimulable phosphor layer of the stimulable phosphor sheet stores energy from the radiation. At the same time, the phosphor produces the fluorescence, and the stimulable phosphor layer is exposed to the fluorescence. The fluorescence has the effects of erasing the energy stored on the stimulable phosphor layer during its exposure to the radiation. Therefore, the erasing operation and the operation for recording a radiation image are carried out simultaneously. The amount of the fluorescence produced by the phosphor is larger at part exposed to a higher dose of radiation. Specifically, the erasing operation is effected to a higher extent at part exposed to a higher dose of radiation. Therefore, the dynamic range of the amount of energy stored on the stimulable phosphor sheet during its exposure to the radiation becomes narrower than when the phosphor which produces the fluorescence is not used. As a result, the range of the amount of light emitted by the stimulable phosphor sheet in proportion to the amount of energy stored thereon during its exposure to the radiation becomes compressed. Accordingly, with the radiation image recording method in accordance with the present invention, even when a stimulable phosphor sheet was exposed to a high dose of radiation, light emitted by the stimulable phosphor sheet can be detected accurately over the whole range of the amount of the emitted light. Also, part of the image, which was recorded with a low dose of radiation, can be read out at a high contrast resolution.

Additionally, with the radiation image recording method in accordance with the present invention, a markedly high level of energy is not stored on the stimulable phosphor layer during its exposure to the radiation. Therefore, the problems can be prevented from occurring in that, when the radiation image is read out from the stimulable phosphor sheet, a markedly high level of light is emitted by part of the stimulable phosphor sheet, which was exposed to a high dose of radiation, due to flare of stimulating rays, or in that a markedly high level of after-glow is produced by such part of the stimulable phosphor sheet. Accordingly, with the radiation image recording method in accordance with the present invention, it is possible to eliminate the problems in that the contrast of an image part, which is to be viewed, is adversely affected by the light emitted due to flare of stimulating rays or due to the after-glow. Consequently, a visible radiation image can be reproduced which has good image quality and can serve as an effective tool in, for example, detection of a flaw in the object.

BRIEF DESCRIPTION OF THE DRAWINGS

FIG. 12 is a schematic view showing an embodiment of the cassette in accordance with the present invention, FIG. 13 is a schematic view showing another embodiment of the cassette in accordance with the present invention.

DESCRIPTION OF THE PREFERRED EMBODIMENTS

The present invention will hereinbelow be described in further detail with reference to the accompanying drawings.

Figure 1:
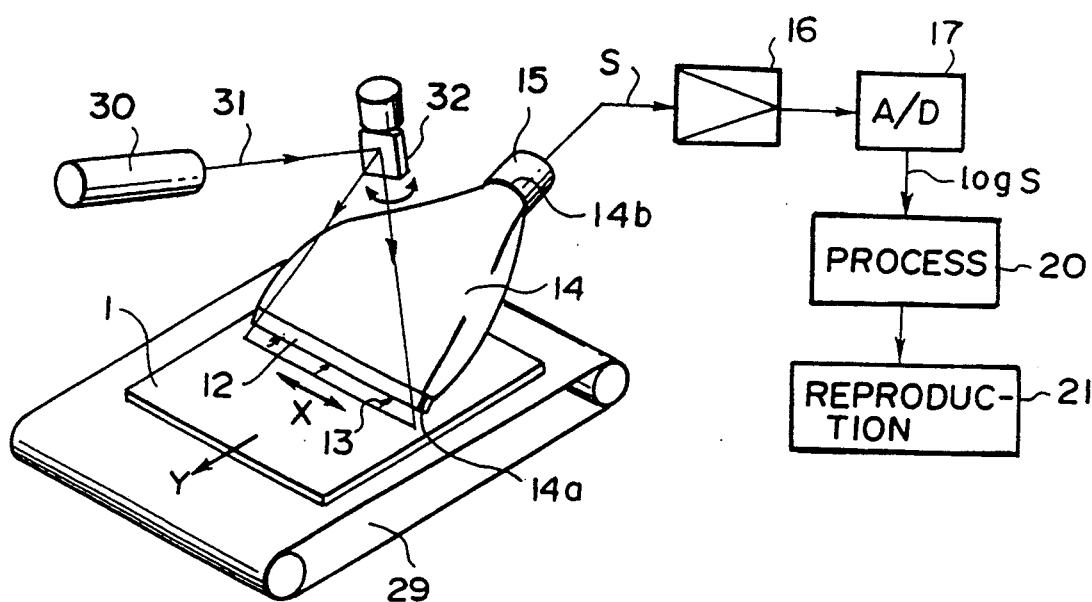
FIG. 1 is a perspective view showing an embodiment of the first radiation image read-out apparatus in accordance with the present invention.
Figure 2:
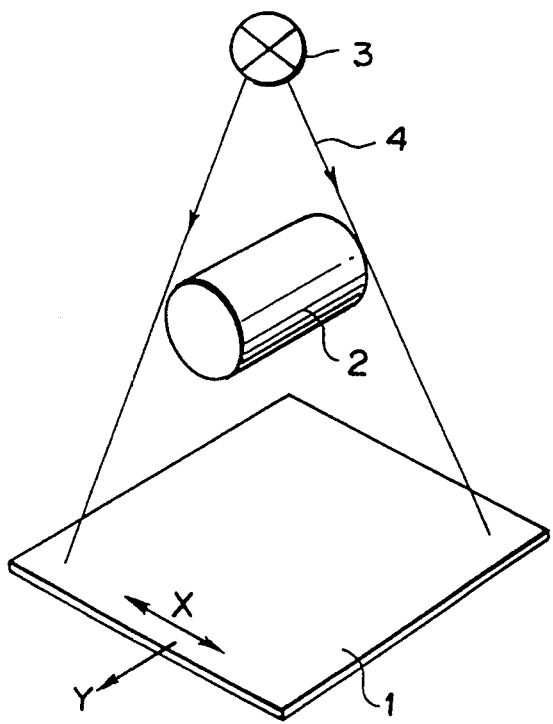
FIG. 2 is a schematic perspective view showing how a radiation image is recorded on a stimulable phosphor sheet, from which the radiation image is read out with the first radiation image read-out apparatus in accordance with the present invention.

FIG. 1 shows an embodiment of the first radiation image read-out apparatus in accordance with the present invention. FIG. 2 shows how a radiation image is recorded on a stimulable phosphor sheet 1, from which the radiation image is read out with the first radiation image read-out apparatus in accordance with the present invention.

How a radiation image is recorded will first be described below with reference to FIG. 2. A round bar 2 serving as an object, from which a flaw is to be detected, is positioned between the stimulable phosphor sheet 1 and a radiation source 3, which may be constituted of an X-ray tube, or the like. X-rays 4 are then produced by the radiation source 3 and irradiated to the round bar 2. The X-rays 4, which have passed through the round bar 2, impinge upon the stimulable phosphor sheet 1. In this manner, a radiation image of the round bar 2 is stored on the stimulable phosphor sheet 1. During the recording of the radiation image, the round bar 2 is located such that its longitudinal axis is parallel to the direction indicated by the arrow Y (i.e. the sub-scanning direction on the stimulable phosphor sheet 1).

After the radiation image of the round bar 2 is stored on the stimulable phosphor sheet 1, the radiation image is read out from the stimulable phosphor sheet 1 by the radiation image read-out apparatus shown in FIG. 1.

Specifically, the stimulable phosphor sheet 1, on which the radiation image has been stored, is conveyed in a sub-scanning direction indicated by the arrow Y by a sub-scanning means 29. The sub-scanning means 29 may be constituted of an endless belt or the like. A laser beam 1, which serves as stimulating rays, is produced by a laser beam source 30. The laser beam 31 is deflected by a light deflector 32, such as a galvanometer mirror, and is caused to scan the stimulable phosphor sheet 1 in main scanning directions indicated by the double headed arrow X. When the stimulable phosphor sheet 1 is exposed to the laser beam 31, the exposed portion of the stimulable phosphor sheet 1 emits light 13 in an amount proportional to the amount of energy stored thereon during its exposure to radiation. The emitted light 13 enters a light guide member 14 at its light input face 14a. The light guide member 14 is formed of a transparent acrylic plate. The emitted light 13, which has entered the light guide member 14, is guided through repeated total reflection inside of the light guide member 14, emanates from a circular light output face 14b of the light guide member 14, and is received by a photomultiplier 15. The photomultiplier 15 generates an image signal S, the level of which is proportional to the amount of the emitted light 13, i.e. which represents the radiation image.

An optical filter 12 is located so that it is in close contact with the light input face 14a of the light guide member 14. The optical filter 12 will later be described in detail.

The image signal S generated by the photomultiplier 15 is logarithmically amplified by a logarithmic amplifier 16, and digitized by an A/D converter 17 into a digital image signal logS. The digital image signal logS is fed into an image processing circuit 20, which carries out image processing, such as gradation processing or frequency response processing. The processed image signal is fed into an image reproducing apparatus 21 and used during the reproduction of a visible radiation image. The image reproducing apparatus 21 may be a display means, such as a CRT display device, or a recording apparatus for recording a radiation image by a light beam scanning operation on photosensitive film.

Figure 3:
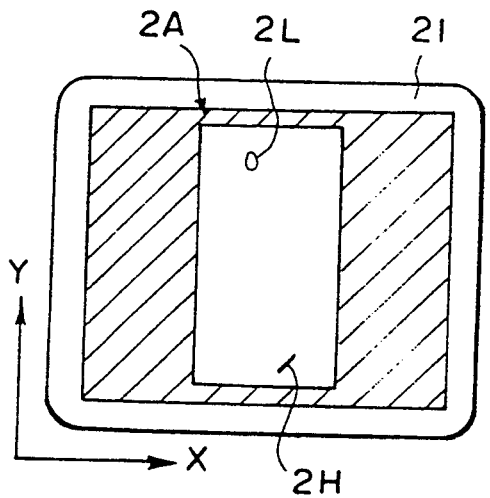
FIG. 3 is a schematic front view showing a radiation image reproduced from an image signal, which has been obtained with the first radiation image read-out apparatus in accordance with the present invention.

FIG. 3 shows an example of the radiation image reproduced in the manner described above. In FIG. 3, reference numeral 21 denotes a CRT, which serves as an image reproducing apparatus, and reference numeral 2A denotes a radiation image of the round bar 2. The thickness of the round bar 2 at a flawed part is smaller than the surrounding parts, and therefore the radiation absorptivity of the round bar 2 at said part is lower than the surrounding parts. Accordingly, the flawed part appears as an image 2H having a higher image density than the surrounding parts. Such an image 2H appears even when a flaw is located at a position deep from the surface of the round bar 2. Therefore, any flaw present in the round bar 2 can be detected accurately. A defective part of the round bar 2, which part has a larger thickness than surrounding parts, appears as an image 2L having a lower image density than the surrounding parts in the reproduced image.

Figure 4A:
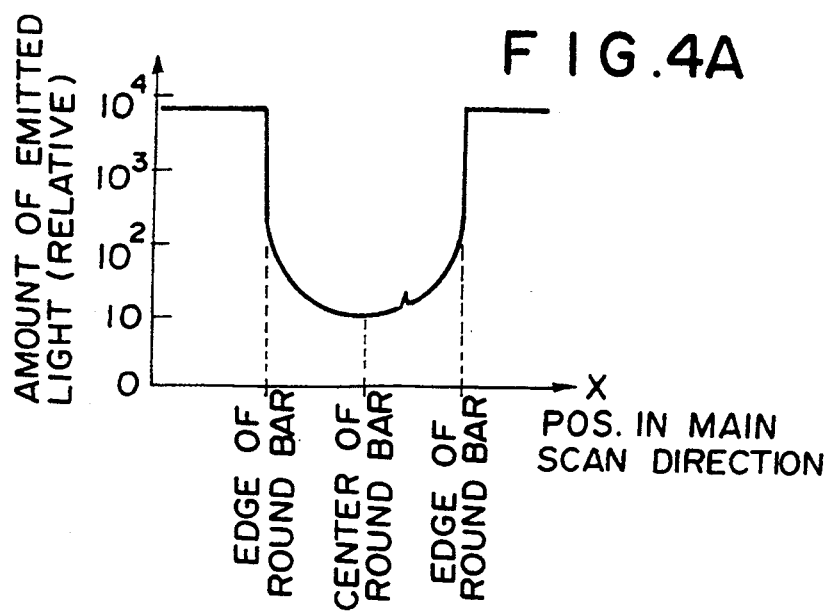
FIGS. 4A, 4B, 4C, 4D and 4E are graphs showing how the optical filter employed in the first radiation image read-out apparatus in accordance with the present invention works.

FIG. 4A shows the distribution of the level of energy stored along a single main scanning line on the stimulable phosphor sheet 1 during its exposure to the radiation 4, i.e. the distribution of the amount of light emitted by the stimulable phosphor sheet 1 along a single main scanning line when the stimulable phosphor sheet 1 is exposed to the laser beam 31. At the center part of the round bar 2, which center part is taken in the main scanning directions, the thickness of the round bar 2, through which the radiation 4 must pass during the recording of the radiation image of the round bar 2, is largest and the radiation absorptivity is highest. Therefore, as illustrated in FIG. 4A, the amount of light emitted by the stimulable phosphor sheet 1 is smallest at the part corresponding to the center part of the round bar 2. Also, the thickness of the round bar 2, through which the radiation 4 must pass during the recording of the radiation image of the round bar 2, decreases gradually toward the edges of the round bar 2. Therefore, the amount of light emitted by the stimulable phosphor sheet 1 increases gradually toward the parts corresponding to the edges of the round bar 2. During the recording of the radiation image of the round bar 2, the part (background region) of the stimulable phosphor sheet 1 outward from the parts corresponding to the edges of the round bar 2 were directly exposed to the radiation 4. Therefore, during the readout of the radiation image of the round bar 2 from the stimulable phosphor sheet 1, the largest amount of light is emitted from the background region. As described above, the dynamic range of the amount of light emitted by the stimulable phosphor sheet 1 often becomes wider than $10^4$.

Figure 4B:
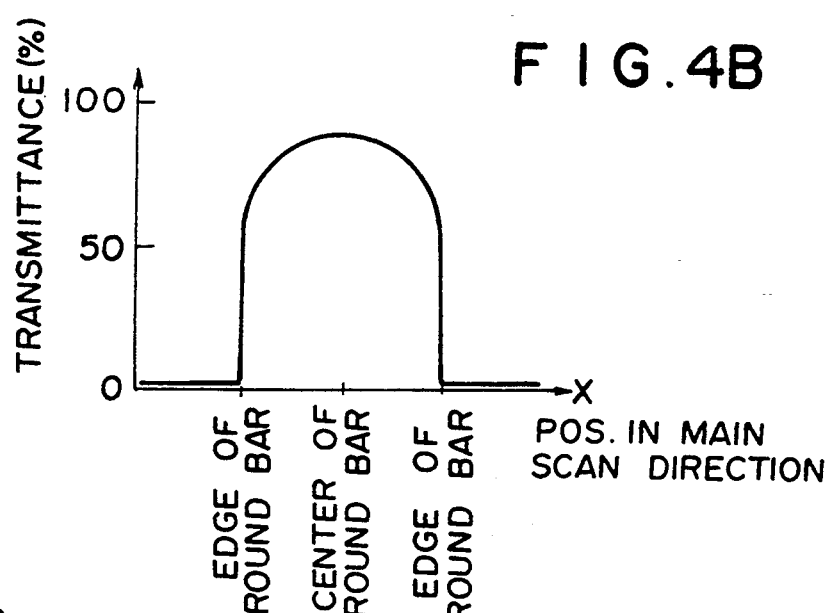

FIG. 4B shows the distribution of the transmittance of the optical filter 12 shown in FIG. 1 with respect to light having wavelengths within the wavelength distribution range of the light 13 emitted by the stimulable phosphor sheet 1. The distribution of the transmittance of the optical filter 12 with respect to the light 13 emitted by the stimulable phosphor sheet 1 is taken along the main scanning line. As is clear from the comparison of FIG. 4B with FIG. 4A, the transmittance of the optical filter 12 with respect to the light 13 emitted by the stimulable phosphor sheet 1 is distributed such that a basic difference in the radiation absorptivity of the round bar 2 is compensated for. Specifically, the optical filter 12 has the highest transmittance at the part facing the center part of the stimulable phosphor sheet 1, at which the image of the center part of the round bar 2 has been stored. The transmittance of the optical filter 12 with respect to the light 13 emitted by the stimulable phosphor sheet 1 decreases gradually from the part facing the center part of the stimulable phosphor sheet 1 toward the parts facing the parts of the stimulable phosphor sheet 1, at which the images of the edges of the round bar 2 have been stored. Also, as illustrated in FIG. 4B, the parts of the optical filter 12 outward from the parts facing the parts of the stimulable phosphor sheet 1, at which the images of the edges of the round bar 2 have been stored, approximately filter out the light 13 emitted by the stimulable phosphor sheet 1.

Figure 4C:
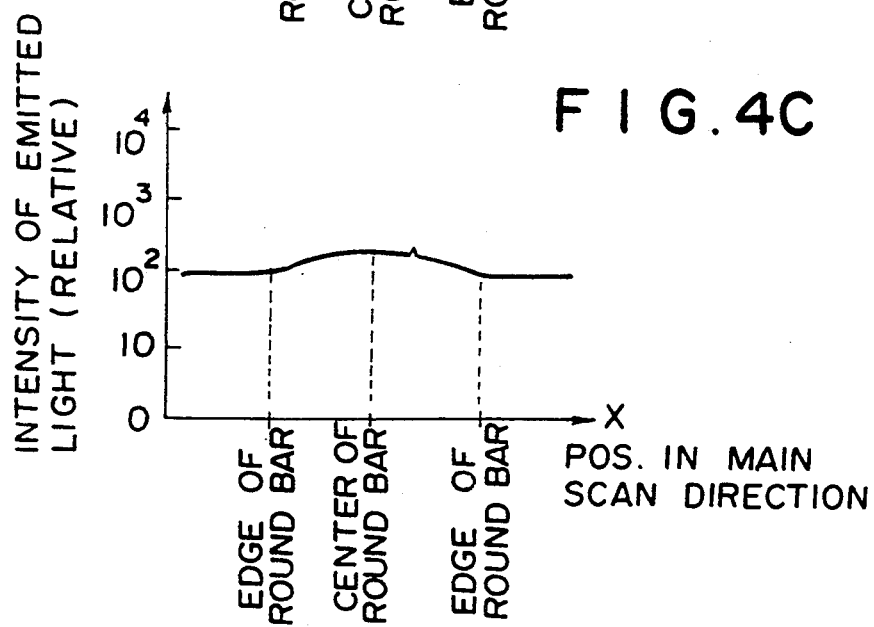
Figure 4D:
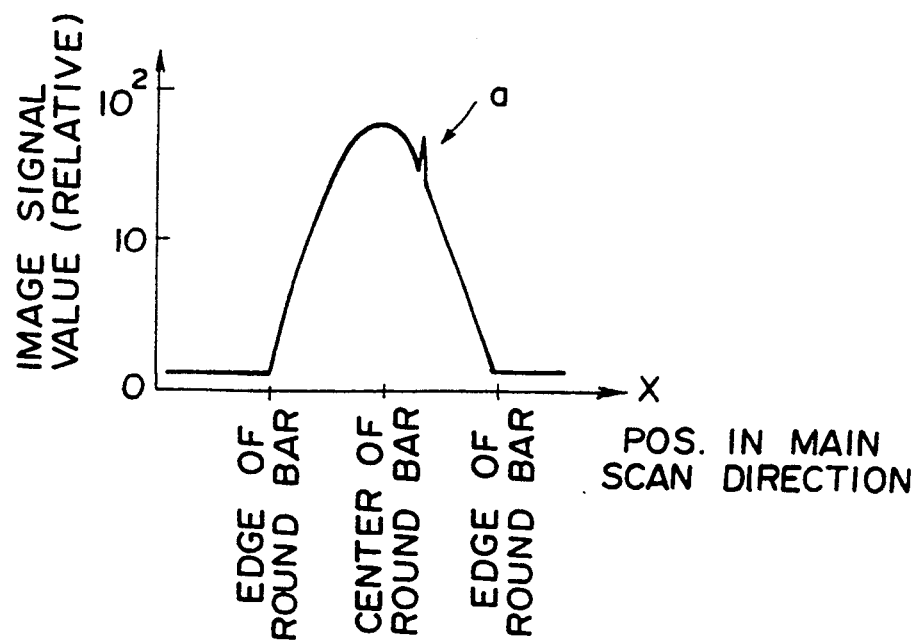
Figure 4E:
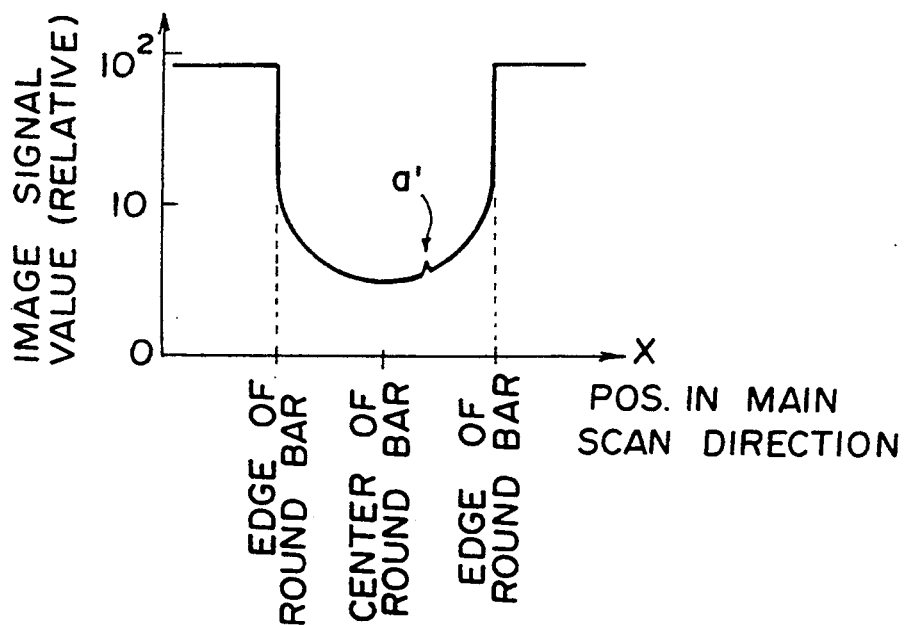

The optical filter 12 has the characteristics described above. Therefore, when the light 13 emitted by the stimulable phosphor sheet 1 passes through the optical filter 12 and is then detected by the photomultiplier 15, the intensity of the light 13 detected changes approximately in the manner shown in FIG. 4C along the main scanning line. Specifically, the dynamic range of the intensity of the detected light is compressed to a range narrower than the range of the amount of the emitted light 13 shown in FIG. 4A. Therefore, when the light 13, which has passed through the optical filter 12 and then enters the photomultiplier 15, is detected with the read-out range of approximately $10^2$ being utilized broadly, a read-out image signal S having the values shown in FIG. 4D is obtained. As shown in FIG. 4D, if a flaw is present in the round bar 2, a signal change a representing the flaw will occur in the read-out image signal S. If the amount of the emitted light 13 extending over the wide dynamic range shown in FIG. 4A were detected directly with the read-out range of approximately $10^2$, the signal change representing the flaw would occur as indicated by a′ in FIG. 4E. The signal change a shown in FIG. 4D is larger than the signal change a′.

Also, in this embodiment, the light 13 emitted by the background region of the stimulable phosphor sheet 1 is filtered out by the optical filter 12. Therefore, the problem is prevented from occurring in that, in the reproduced radiation image shown in FIG. 3, the boundary between the round bar image 2A and the surrounding parts becomes unsharp due to the light 13 emitted by the background region.

In the aforesaid embodiment of the first radiation image read-out apparatus in accordance with the present invention, the radiation image of the round bar 2 is read out from the stimulable phosphor sheet 1. The first radiation image read-out apparatus in accordance with the present invention is applicable also when a radiation image of an object, such as a pipe or a die steel product, is read out from a stimulable phosphor sheet. In each case, an optical filter is employed which has transmittance with respect to the light emitted by the stimulable phosphor sheet, which transmittance is distributed in accordance with how the radiation absorptivity of the object is distributed. The distribution of the transmittance of the optical filter with respect to the light emitted by the stimulable phosphor sheet may be fixed or may be variable. In the latter case, for example, the optical filter may be composed of an array of a plurality of liquid crystal cells, and the distribution of the transmittance of the optical filter with respect to the light emitted by the stimulable phosphor sheet may be varied by changing the voltage applied to each liquid crystal cell. In cases where such an optical filter is employed, a single optical filter can be used for different objects having different distributions of the radiation absorptivity.

An embodiment of the second radiation image read-out apparatus in accordance with the present invention will be described hereinbelow.

Figure 5:
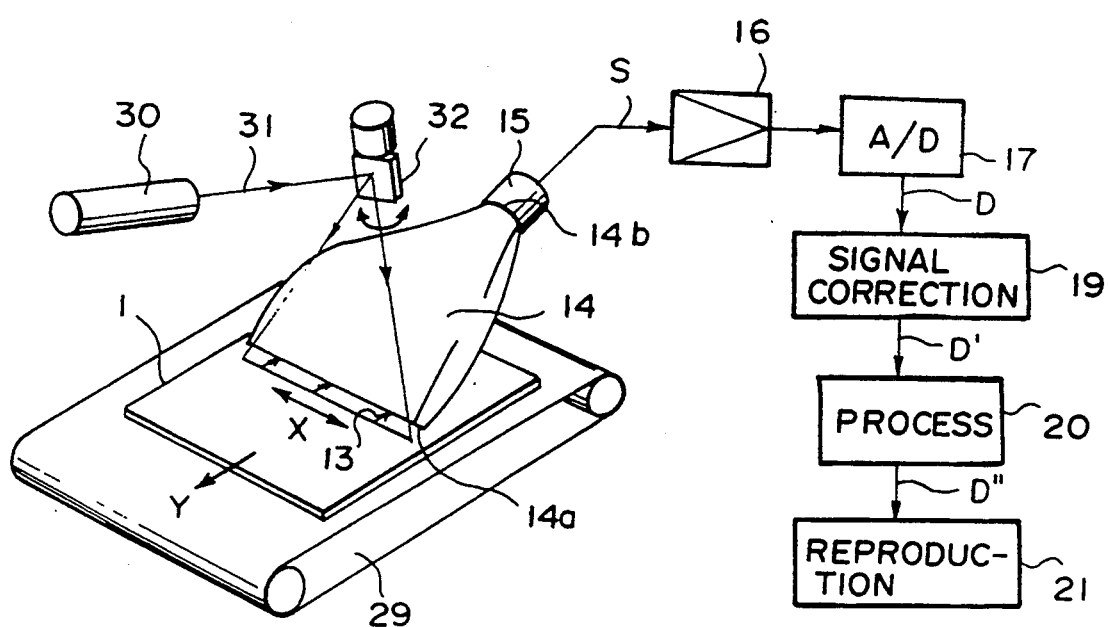
FIG. 5 is a perspective view showing an embodiment of the second radiation image read-out apparatus in accordance with the present invention.

FIG. 5 shows the embodiment of the second radiation image read-out apparatus in accordance with the present invention. In FIG. 5, similar elements are numbered with the same reference numerals with respect to FIG. 1.

After a radiation image is stored on a stimulable phosphor sheet 1 in the manner described above with reference to FIG. 2, the radiation image is read out by the radiation image read-out apparatus shown in FIG. 5. An image signal S generated by the photomultiplier 15 is logarithmically amplified by the logarithmic amplifier 16 and is then converted by the A/D converter 17 into a digital image signal D. The digital image signal D is fed into a signal correcting circuit 19 and is corrected into a signal D′. The signal D′ is then fed into the image processing circuit 20, which carries out image processing, such as gradation processing, on the signal D′. A signal D″ obtained from the image processing circuit 20 is fed into the image reproducing apparatus 21. In the same manner as that described above, a radiation image shown in FIG. 3 is reproduced by the image reproducing apparatus 21.

Figure 6A:
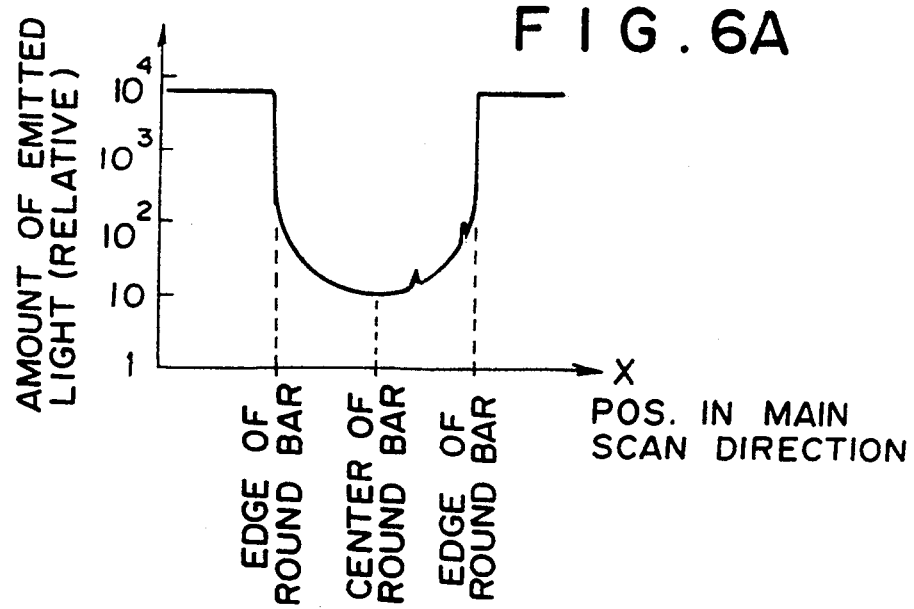
FIGS. 6A, 6B, 6C, 6D and 6E are graphs showing how an image signal is corrected and how the contrast is enhanced in the embodiment of FIG. 5, FIGS. 7A, 7B and 7C are graphs showing how an image signal is corrected and how the contrast is enhanced in another embodiment of the second radiation image read-out apparatus in accordance with the present invention.

FIG. 6A shows the distribution of the level of energy stored along a single main scanning line on the stimulable phosphor sheet 1 during its exposure to the radiation 4, i.e. the distribution of the amount of light emitted by the stimulable phosphor sheet 1 along a single main scanning line when the stimulable phosphor sheet 1 is exposed to the laser beam 31. At the center part of the round bar 2, which center part is taken in the main scanning directions, the thickness of the round bar 2, through which the radiation 4 must pass during the recording of the radiation image of the round bar 2, is largest and the radiation absorptivity is highest. Therefore, as illustrated in FIG. 6A, the amount of light emitted by the stimulable phosphor sheet 1 is smallest at the part corresponding to the center part of the round bar 2. Also, the thickness of the round bar 2, through which the radiation 4 must pass during the recording of the radiation image of the round bar 2, decreases gradually toward the edges of the round bar 2. Therefore, the amount of light emitted by the stimulable phosphor sheet 1 increases gradually toward the parts corresponding to the edges of the round bar 2. During the recording of the radiation image of the round bar 2, the part (background region) of the stimulable phosphor sheet 1 outward from the parts corresponding to the edges of the round bar 2 were directly exposed to the radiation 4. Therefore, during the readout of the radiation image of the round bar 2 from the stimulable phosphor sheet 1, the largest amount of light is emitted from the background region. As described above, the dynamic range of the amount of light emitted by the stimulable phosphor sheet 1 often becomes wider than $10^4$.

The signal correcting circuit 19 shown in FIG. 5 generates a predetermined correction signal, C and converts the image signal D into a corrected image signal D', which is expressed as $$D' = (D+C)/2.$$

Figure 6B:
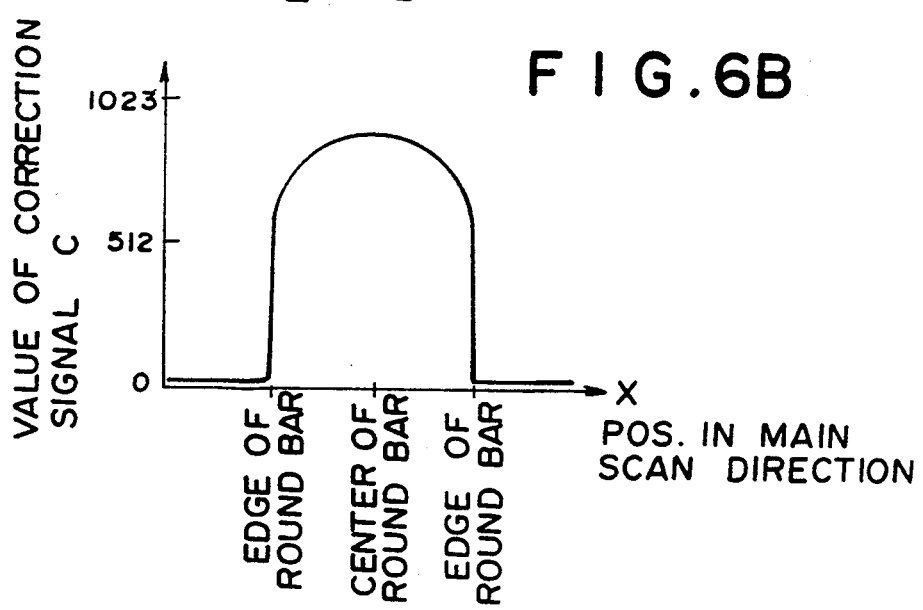

The values of the correction signal C are distributed in the pattern shown in FIG. 6B along the main scanning line. As is clear from the comparison of FIG. 6B with FIG. 6A, the correction signal C has the characteristics that compensate for the basic difference in the radiation absorptivity of the round bar 2.

In this embodiment, the digital image signal D takes 10-bit values ranging from 0 to 1,023. Also, the correction signal C takes the values falling within the same range as the digital image signal D.

Figure 6C:
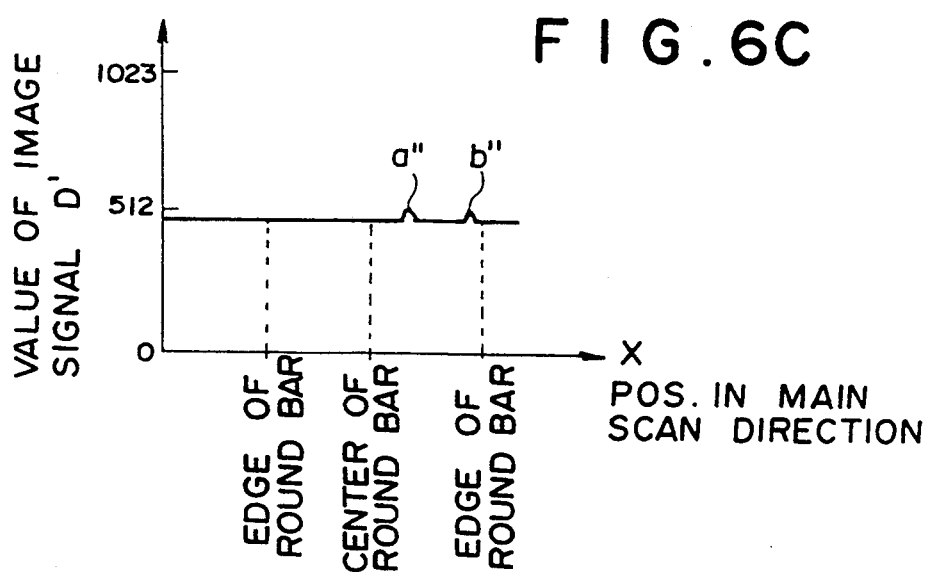

The corrected image signal D' takes values shown in, for example, FIG. 6C. On the other hand, the image signal D before being corrected takes values shown in FIG. 6E. The dynamic range of the corrected image signal D' is compressed into a range narrower than the dynamic range of the image signal D.

Figure 6D:
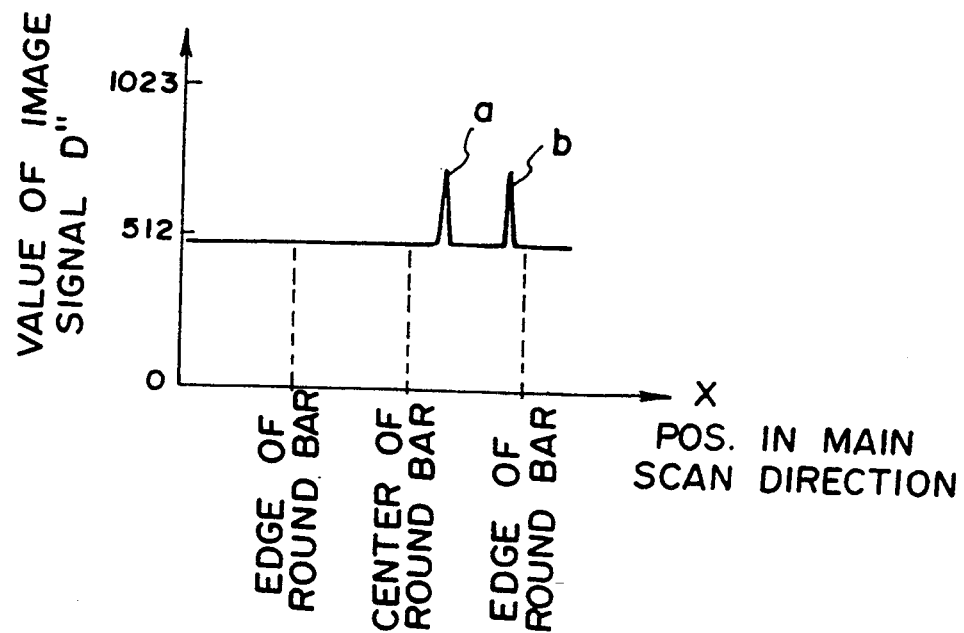
Figure 6E:
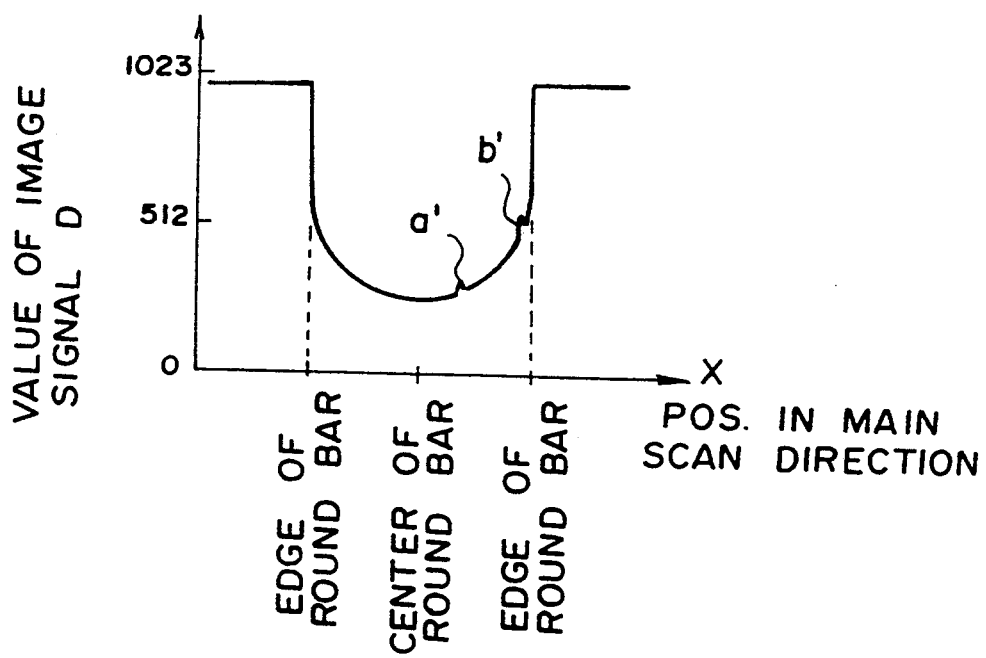

As described above, the corrected image signal D' is subjected to image processing in the image processing circuit 20. At this time, contrast enhancement processing is also carried out on the corrected image signal D'. The processed image signal D'' thus obtained takes the values shown in FIG. 6D. As shown in FIG. 6D, if flaws are present in the round bar 2, signal changes a and b representing the flaws will occur in the processed image signal D''. As shown in FIG. 6E, in the image signal D, the signal changes occur as indicated by a' and b'. However, as shown in FIG. 6C, the distribution of the values of the corrected image signal D' is approximately flat. Therefore, in cases where contrast enhancement processing is carried out on the corrected image signal D' the signal changes a and b can be rendered sufficiently larger than the signal changes a' and b'. When a visible image is reproduced from the processed image signal D'' having the signal changes a and b, the flaws represented by the signal changes a and b can be illustrated clearly in the visible image.

Figure 7A:
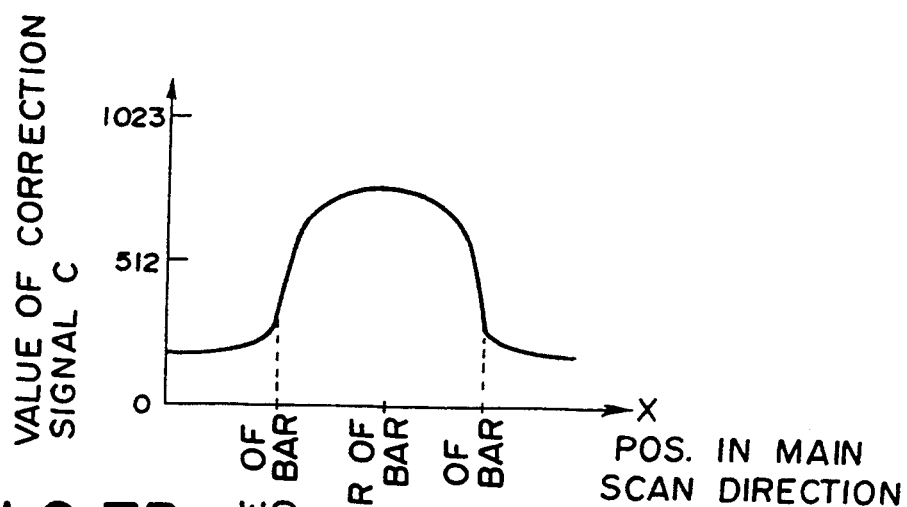
Figure 7B:
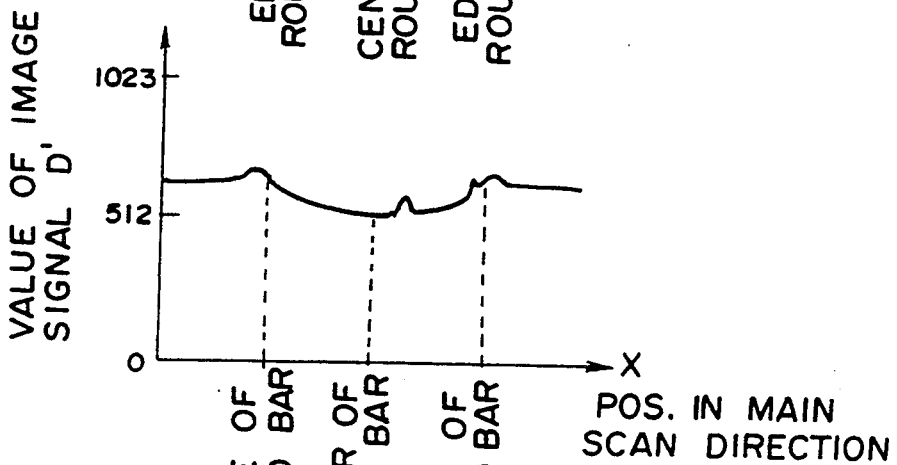
Figure 7C:
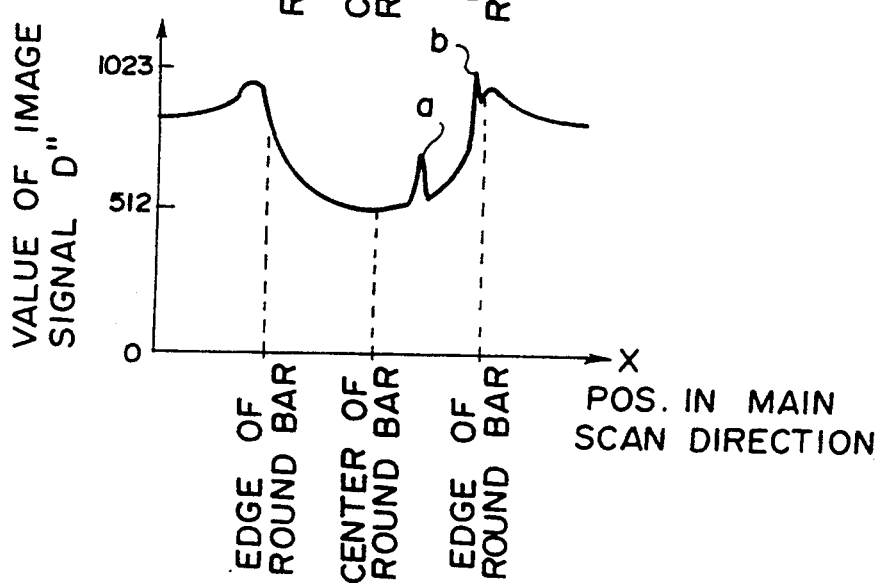

In the aforesaid embodiment of the second radiation image read-out apparatus in accordance with the present invention, the correction signal C converts the image signal D into the image signal D ' having the values distributed approximately flat. However, any of other correction signals may be employed which has the characteristics that compensate for the basic difference in the radiation absorptivity of the object. For example, a correction signal C having the characteristics shown in FIG. 7A may be employed. FIG. 7B shows an example of the distribution of the values of an image signal D ' which has been corrected with the correction signal C shown in FIG. 7A. FIG. 7C shows an example of the distribution of the values of an image signal D'' which has been obtained by carrying out contrast enhancement processing on the corrected image signal D' shown in FIG. 7B.

Figure 8:
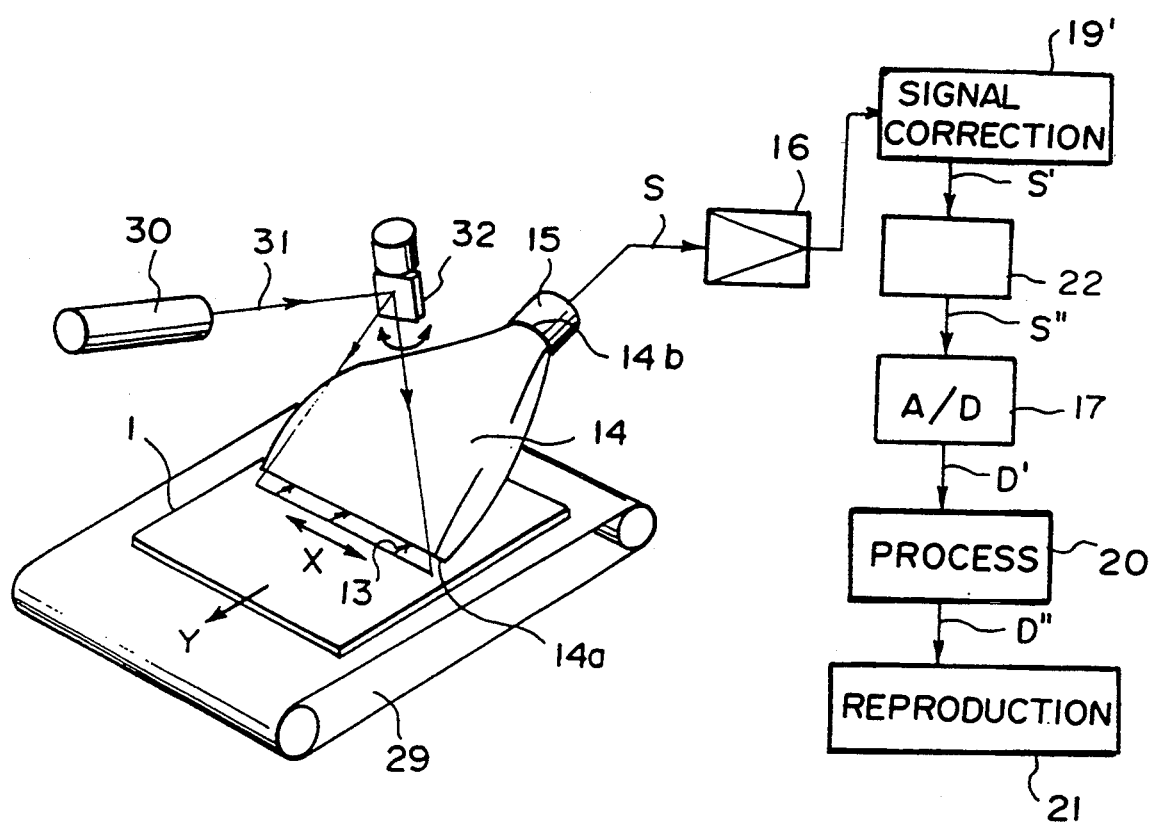
FIG. 8 is a perspective view showing another embodiment of the second radiation image read-out apparatus in accordance with the present invention.

In the aforesaid embodiment of the second radiation image read-out apparatus in accordance with the present invention, the signal correcting circuit 19 is located after the A/D converter 17 in order to correct the digital image signal D. Alternatively, the signal correcting circuit 19 may be located before the A/D converter 17, and the analog image signal S may be corrected. FIG. 8 shows such an embodiment of the second radiation image read-out apparatus in accordance with the present invention. In FIG. 8, similar elements are numbered with the same reference numerals with respect to FIG. 5.

In the embodiment of FIG. 8, a signal correcting circuit 19' is located after the logarithmic amplifier 16. The signal correcting circuit 19' corrects the analog image signal S in the same manner as the signal correcting circuit 19 shown in FIG. 5. In this manner, a corrected image signal S' having a compressed dynamic range is obtained. The corrected image signal S' is then amplified by an amplifier 22 into an image signal S'' having enhanced contrast. The image signal S'' is converted into a digital image signal D' by the A/D converter 17. The digital image signal D ' is then fed into the image processing circuit 20, which carries out image processing on the digital image signal D'. The processed image signal D'' generated by the image processing circuit 20 is then used during the reproduction of a visible radiation image. With this embodiment, the signal correction and contrast enhancement processing are carried out on the analog image signal at the stage prior to the A/D converter 17. Therefore, the bit resolution of the A/D converter 17 can be utilized fully. Accordingly, defects, such as flaws, in the object can be illustrated more perceptibly in the reproduced radiation image.

In the aforesaid embodiments of the second radiation image read-out apparatus in accordance with the present invention, the radiation image of the round bar 2 is read out from the stimulable phosphor sheet 1. The second radiation image read-out apparatus in accordance with the present invention is applicable also when a radiation image of an object, such as a pipe or a die steel product, is read out from a stimulable phosphor sheet. In each case, a correction signal is employed which can correct a signal in accordance with how the radiation absorptivity of the object is distributed.

In the aforesaid embodiments of the second radiation image read-out apparatus in accordance with the present invention, the dynamic range of the image signal is compressed by the signal correction circuit 19 or the signal correcting circuit 19', and then contrast enhancement processing is carried out. However, contrast enhancement processing need not necessarily be carried out. Insofar as the distribution of the values of the image signal is rendered flat, defects, such as flaws, in the object can be detected easily regardless of how the radiation absorptivity of the object is distributed. Specifically, if the image signal is not corrected, as shown in FIG. 6E, the signal change b' representing a flaw, which is present at an edge of the round bar 2, cannot be detected easily. However, when the image signal is corrected into the image signal D' having the values distributed approximately flat as shown in FIG. 6C, the signal change b" representing the flaw, which is present near an edge of the round bar 2, becomes as large as the signal change a", and therefore can be detected easily.

An embodiment of the radiation image recording apparatus in accordance with the present invention will be described hereinbelow with reference to FIG. 9.

A stimulable phosphor sheet 10 is conveyed vertically by a sheet conveyance means, which comprises endless belts 40, 41 and endless belts, or the like, located above and below the endless belts 40, 41. During the recording of a radiation image on the stimulable phosphor sheet 10, the stimulable phosphor sheet 10 is kept stationary at the image recording position shown in FIG. 9. A radiation source 42, which may be constituted of an X-ray tube, or the like, is located facing the stimulable phosphor sheet 10, which is located at the image recording position. An object 43 is placed between the radiation source 42 and the stimulable phosphor sheet 10, and the radiation source 42 is then activated to produce X-rays 44. The X-rays 44 produced by the radiation source 42 pass through the object 43. The X-rays 44, which have passed through the object 43, impinge upon the stimulable phosphor sheet 10. As a result, energy from the X-rays 44 is stored on a stimulable phosphor layer of the stimulable phosphor sheet 10. In this manner, a radiation image of the object 43 is stored on the stimulable phosphor sheet 10.

Figure 14:
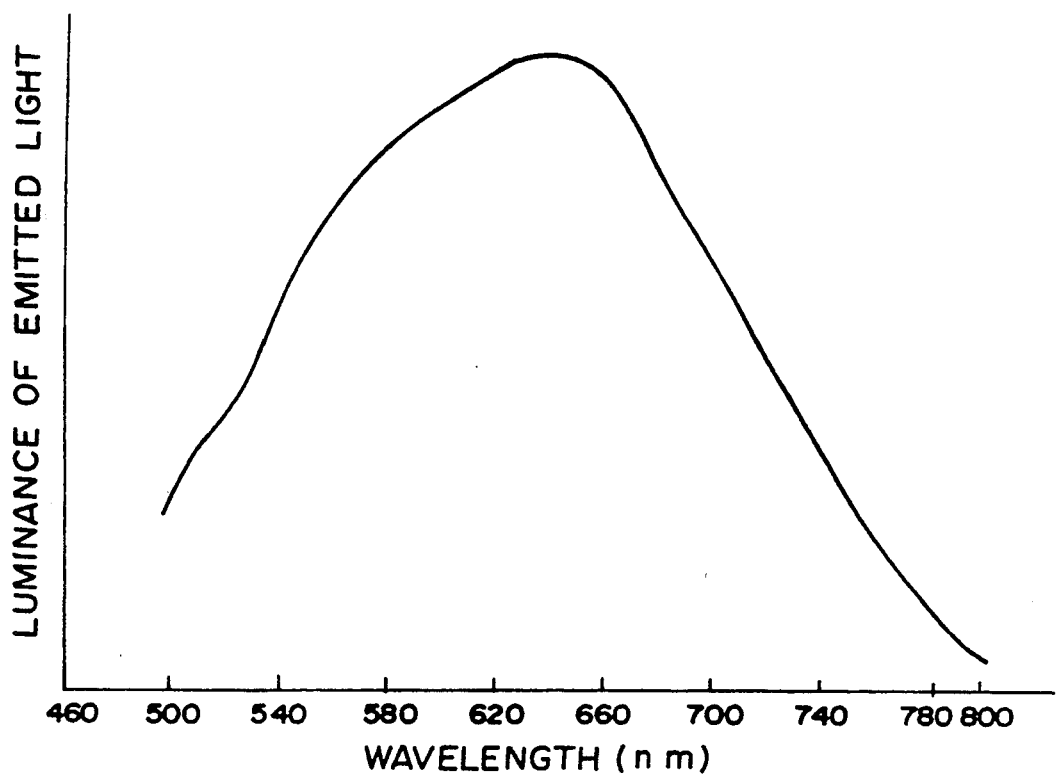
FIG. 14 is a graph showing the stimulation spectrum of a stimulable phosphor represented by the formula $BaFBr:Eu^{2+}$.
Figure 15:
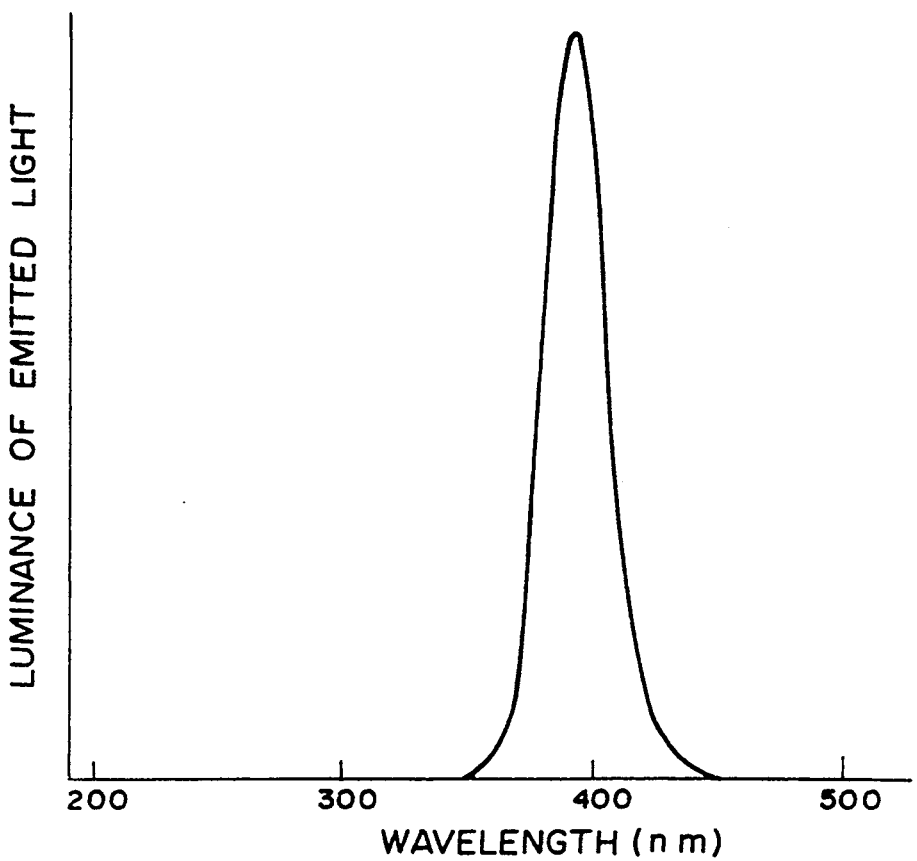
FIG. 15 is a graph showing the light emission spectrum of a stimulable phosphor represented by the formula $BaFBr:Eu^{2+}$.

In this embodiment, a stimulable phosphor represented by the formula BaFBr:Eu$^{2+}$ is employed as the stimulable phosphor, which constitutes the stimulable phosphor layer of the stimulable phosphor sheet 10. FIG. 14 is a graph showing the stimulation spectrum of the stimulable phosphor represented by the formula BaFBr:Eu$^{2+}$, i.e. the spectrum of stimulating rays which are capable of causing said stimulable phosphor to emit light in proportion to the amount of energy stored thereon during its exposure to radiation. FIG. 15 is a graph showing the light emission spectrum of the stimulable phosphor represented by the formula BaFBr:Eu$^{2+}$. Also, as one of the features of the radiation image recording apparatus in accordance with the present invention, a phosphor sheet 70 provided with a layer of a phosphor represented by the formula Gd$_2$O$_2$S:Tb$^{3+}$ is held inside of the space defined by the endless belt 41, which is transparent. The phosphor sheet 70 is located close to and facing the stimulable phosphor sheet 10, which is held at the image recording position.

When the phosphor represented by the formula Gd$_2$O$_2$S:Tb$^{3+}$ is exposed to X-rays, it produces the fluorescence (i.e. instantaneously emitted light and an after-glow) 71 primarily having a wavelength of 549nm. Therefore, the stimulable phosphor sheet 10 is exposed to the fluorescence 71 as long as the stimulable phosphor sheet 10 is exposed to the X-rays 44 in the manner described above and for a short time after the exposure of the stimulable phosphor sheet 10 to the X-rays 44 is ceased. As is clear from FIG. 14, the wavelengths of the fluorescence 71 fall within the stimulation wavelength range of the stimulable phosphor, which is represented by the formula BaFBr:Eu$^{2+}$ and which constitutes the stimulable phosphor layer of the stimulable phosphor sheet 10. Therefore, when the stimulable phosphor sheet 10 is exposed to the fluorescence 71, part of the energy stored on the layer of the stimulable phosphor represented by the formula BaFBr:Eu$^{2+}$ during its exposure to the X-rays 44 is released. In this manner, the stimulable phosphor sheet 10 is approximately simultaneously subjected to the operation for recording the radiation image and the operation for slightly erasing the energy stored thereon during its exposure to the X-rays 44.

Figure 16:
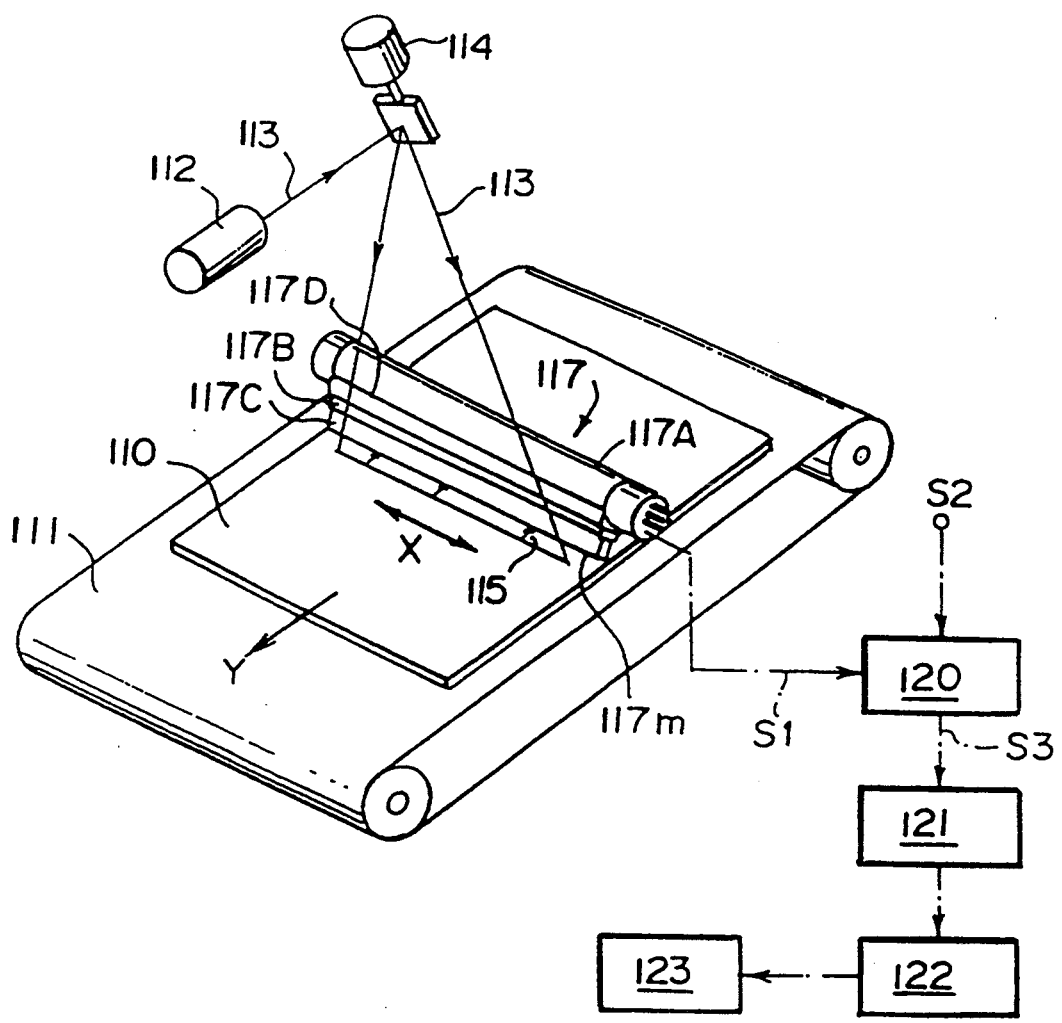
FIG. 16 is a schematic perspective view showing an example of a radiation image read-out apparatus.

After the radiation image is stored on the stimulable phosphor sheet 10, it is read out by a radiation image read-out apparatus shown in FIG. 16. How the radiation image is read out will be described hereinbelow.

The stimulable phosphor sheet 10, on which the radiation image has been stored, is conveyed by a sheet conveyance means 111, which may be constituted of an endless belt, or the like, in the sub-scanning direction indicated by the arrow Y. At the same time, a laser beam 113 is produced by a laser beam source 112. The laser beam 113 is deflected by a light deflector 114, which may be constituted of a galvanometer mirror, or the like. The laser beam 113 is thus caused to scan the stimulable phosphor sheet 10 in the main scanning directions indicated by the double headed arrow X, which directions are approximately normal to the sub-scanning direction indicated by the arrow Y. In this example, the laser beam source 112 is constituted of an He—Ne laser which produces a laser beam 113 having a wavelength of $\lambda 1 = 632.8$ nm.

When the stimulable phosphor sheet 10 is exposed to the laser beam 113, the exposed portion of the stimulable phosphor sheet 10 emits light 115 in an amount proportional to the amount of energy stored thereon during its exposure to the radiation. The emitted light 115 is detected by a long photomultiplier 117, which is described in detail in, for example, U.S. Pat. No. 4,864,134. The photomultiplier 117 generates an output S1, which represents the amount of the emitted light 115. The output S1 is fed into a read-out circuit 120, which carries out processing, such as amplification and logarithmic conversion, on the output S1. Also, the output S1, which has been obtained for each of predetermined periods, is integrated in accordance with a synchronizing signal S2, which is synchronized to the scanning of the laser beam 113. In this manner, a time-serial, analog read-out image signal S3, which has been divided into picture elements, is generated by the read-out circuit 120. By way of example, the read-out image signal S3 is then digitized by an A/D converter 121. The digital image signal thus obtained is fed into an image processing circuit 122, which carries out signal processing (image processing), such as gradation processing or frequency response processing, on the digital image signal. The processed image signal obtained from the image processing circuit 122 is then fed into an image reproducing apparatus 123, which may be constituted of a CRT, a printer, or the like. The image reproducing apparatus 123 reproduces a visible radiation image from the processed image signal.

The long photomultiplier 117 has a cylindrical main body 117A, which has been evacuated. A transparent adapter 117D is located so that it is in close contact with a light receiving face of the main body 117A. A filter 117B is located so that it is in close contact with the transparent adapter 117D. The filter 117B substantially transmits the emitted light 115 and filters out the laser beam 113 which is reflected from the stimulable phosphor sheet 10. Also, a light guide member 117C constituted of glass, or the like, is located so that it is in close contact with the filter 117B. The long photomultiplier 117 is located such that an elongated light input face 117m of the light guide member 117C extends close to and along the main scanning line on the stimulable phosphor sheet 10.

Figure 9:
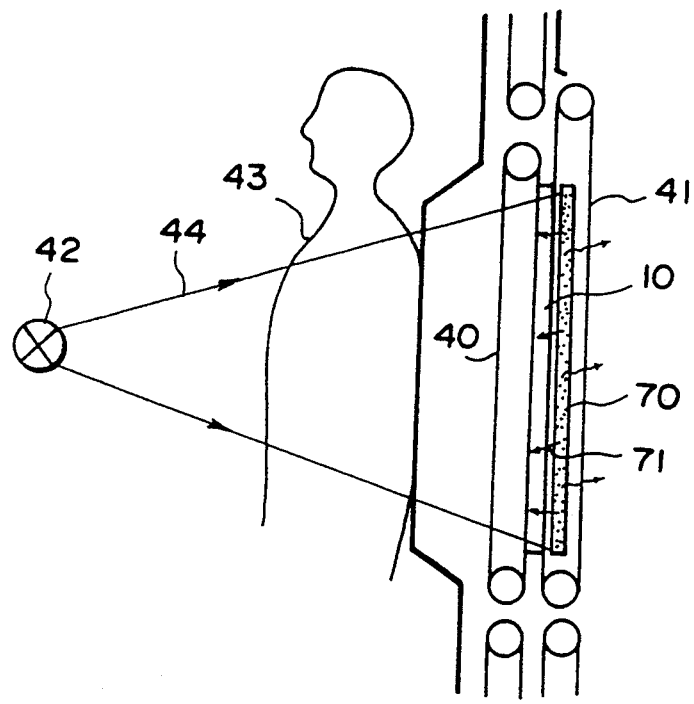
FIG. 9 is a schematic side view showing an embodiment of the radiation image recording apparatus in accordance with the present invention.

The radiation image read-out apparatus shown in FIG. 16 may be independent from the radiation image recording apparatus shown in FIG. 9. Alternatively, as disclosed in, for example, U.S. patent application No. 755,992, a radiation image recording apparatus and a radiation image read-out apparatus may be combined with each other. Also, an erasing section may be provided which release energy remaining on a stimulable phosphor sheet after a radiation image has been read out therefrom. The stimulable phosphor sheet may be circulated between the radiation image recording apparatus, the radiation image read-out apparatus, and the erasing section.

As described above, the stimulable phosphor sheet 10 is approximately simultaneously subjected to the operation for recording the radiation image and the operation for slightly erasing the energy stored thereon during its exposure to the X-rays 44. The extent of the erasing is higher at part of the stimulable phosphor sheet 10, which is exposed to a larger amount of the fluorescence 71, i.e. at part (for example, the background region) of the stimulable phosphor sheet 10, which is exposed to a higher dose of the X-rays 44. By way of example, as for part of the stimulable phosphor sheet 10, which was exposed to the X-rays 44 at a dose of 2mR (i.e. 2 milliroentgen), the amount of light emitted by said part of the stimulable phosphor sheet 10 in cases where the phosphor sheet 70 was used during the recording of the radiation image is approximately the same as (smaller by as little as 0.3% than) the amount of light emitted by said part of the stimulable phosphor sheet 10 when no phosphor sheet was used during the recording of the radiation image. However, as for part of the stimulable phosphor sheet 10, which was exposed to the X-rays 44 at a dose of 2R, the amount of light emitted by said part of the stimulable phosphor sheet 10 in cases where the phosphor sheet 70 was used during the recording of the radiation image is smaller by as large as 96.3% than the amount of light emitted by said part of the stimulable phosphor sheet 10 when no phosphor sheet was used during the recording of the radiation image. Therefore, in cases where the phosphor sheet 70 is used during the recording of the radiation image, the range of the amount of the light 115 emitted by the stimulable phosphor sheet 10 during the readout of the radiation image can be compressed markedly.

Figure 10:
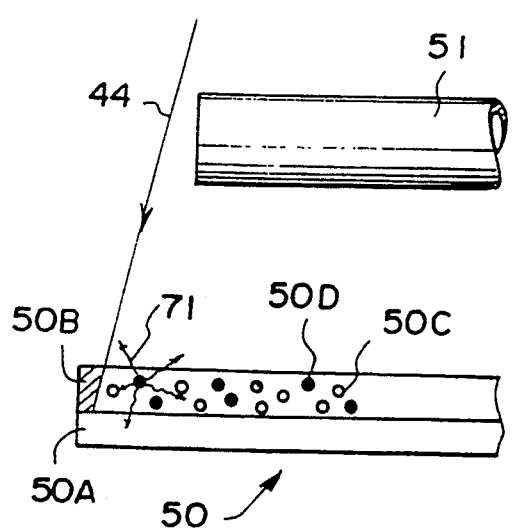
FIG. 10 is a schematic view showing an embodiment of the stimulable phosphor sheet in accordance with the present invention.

An embodiment of the stimulable phosphor sheet in accordance with the present invention will hereinbelow be described with reference to FIG. 10. A stimulable phosphor sheet 50 comprises a sheet-like substrate 50A and a binder layer 50B overlaid on the substrate 50A. A stimulable phosphor 50C and a phosphor 50D are dispersed in the binder layer 50B. The stimulable phosphor represented by the formula $BaFBr:Eu^{2+}$ is employed as the stimulable phosphor 50C. The phosphor represented by the formula $Gd_2O_2S:Tb^{3+}$ is employed as the phosphor 50D.

In the same manner as the stimulable phosphor sheet 10 shown in FIG. 9, the stimulable phosphor sheet 50 is used to record a radiation image of an object 51. In this example, the object 51 is an industrial metal product. As described above, in such cases, the stimulable phosphor sheet 50 is exposed to a particularly high dose of X-rays 44. Also, in the case of the stimulable phosphor sheet 50, part of energy stored in the stimulable phosphor 50C during its exposure to the X-rays 44 is released (i.e. erased) during its exposure to the fluorescence 71, which is produced by the phosphor 50D. The extent of the erasing is higher at part of the stimulable phosphor sheet 50, which is exposed to a higher dose of the X-rays 44. Therefore, the range of the amount of light emitted by the stimulable phosphor sheet 50 during the readout of the radiation image can be compressed markedly.

Figure 11:
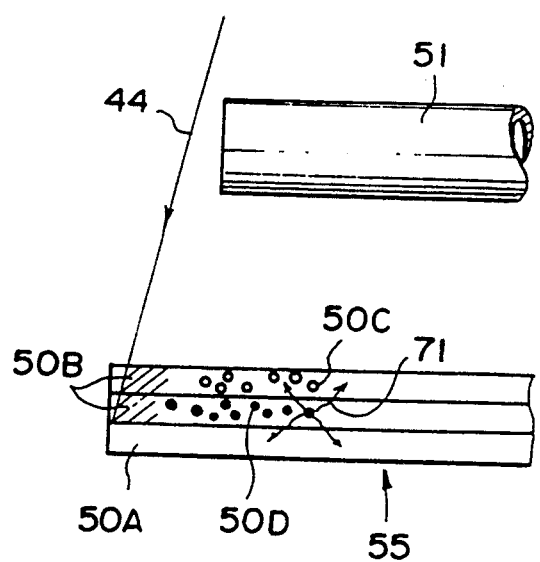
FIG. 11 is a schematic view showing another embodiment of the stimulable phosphor sheet in accordance with the present invention.

Another embodiment of the stimulable phosphor sheet in accordance with the present invention will hereinbelow be described with reference to FIG. 11. In FIG. 11, similar elements are numbered with the same reference numerals with respect to FIG. 10. A stimulable phosphor sheet 55 comprises a substrate 50A, a layer of the phosphor 50D represented by the formula $Gd_2O_2S:Tb^{3+}$ which layer is overlaid on the substrate 50A, and a layer of the stimulable phosphor 50C represented by the formula $BaFBr:Eu^{2+}$, which layer is overlaid on the layer of the phosphor 50D. Even when the layer of the stimulable phosphor 50C and the layer of the phosphor 50D are formed independently of each other, the range of the amount of light emitted by the stimulable phosphor sheet 55 can be compressed in the same manner as that described above with the effects of the phosphor 50D represented by the formula $Gd_2O_2S:Tb^{3+}$.

Conversely to the configuration of FIG. 11, a layer of the stimulable phosphor 50C may be overlaid on the substrate 50A, and a layer of the phosphor 50D may be overlaid on the layer of the stimulable phosphor 50C.

An embodiment of the cassette in accordance with the present invention will be described hereinbelow with reference to FIG. 12. A cassette 60 comprises a square housing 61 constituted of a light-shielding material, and a light-shielding cover member 63, which is supported on the housing 61 by a hinge 62 so that it can be opened. One surface of a lower pad 64 is secured to the cover member 63, and a phosphor sheet 70 is secured to the other surface of the lower pad 64. As in the case of the phosphor sheet 70 used in the radiation image recording apparatus shown in FIG. 9, the phosphor sheet 70 housed in the cassette 60 is provided with a layer of the phosphor represented by the formula $Gd_2O_2S:Tb^{3+}$.

When a radiation image is recorded with the cassette 60, a stimulable phosphor sheet 10 is housed in the housing 61 such that it is in contact with an upper pad 64. The cover member 63 is then closed. As in the case of the stimulable phosphor sheet 10 used in the radiation image recording apparatus shown in FIG. 9, the stimulable phosphor sheet 10 housed in the cassette 60 is provided with a layer of the stimulable phosphor represented by the formula BaFBr:Eu$^{2+}$. When the cover member 63 is closed, the stimulable phosphor sheet 10 becomes in close contact with the phosphor sheet 70.

Thereafter, X-rays 44 are irradiated to the cassette 60, and a radiation image of an object 43 is stored on the stimulable phosphor sheet 10, which is housed in the cassette 60. At this time, the phosphor sheet 70 is also exposed to the X-rays 44 and produces the fluorescence 71. The fluorescence 71 is irradiated to the stimulable phosphor sheet 10. Therefore, the same effects as the radiation image recording apparatus shown in FIG. 9 can be obtained.

FIG. 13 shows another embodiment of the cassette in accordance with the present invention. As shown in FIG. 13, the phosphor sheet 70 may be secured to one surface of the upper pad 64, the other surface of which is secured to the housing 61 of a cassette 65. Also, the stimulable phosphor sheet 10 may be located in the cassette 65 so that it is in close contact with the phosphor sheet 70. When a radiation image is recorded with the cassette 65, the X-rays 44, which have passed through the phosphor sheet 70, impinge upon the stimulable phosphor sheet 10.

The phosphor sheet 70 should preferably be secured releasably to the cassette 60 or the cassette 65. In such cases, the cassette 60 or the cassette 65 can be used also when the recording of a radiation image is carried out with a low dose of radiation. Also, the radiation image recording apparatus shown in FIG. 9 should preferably be constituted such that the phosphor sheet 70 can be moved away from the position close to the stimulable phosphor sheet 10, which is located at the image recording position.

Instead of the phosphor sheet 70 being constituted of the phosphor represented by the formula Gd$_2$O$_2$S:Tb$^{3+}$, it may be constituted of the phosphor, which is represented by the formula Y$_2$O$_2$S:Tb$^{3+}$ and which produces the fluorescence primarily having wavelengths of 415 nm, 440 nm, and 545 nm when it is exposed to X-rays. The wavelengths of the fluorescence produced by the phosphor represented by the formula Y$_2$O$_2$S:Tb$^{3+}$ fall within the stimulation wavelength range of the stimulable phosphor, which is represented by the formula BaFBr:Eu$^{2+}$ and which constitutes the stimulable phosphor sheet 10. Therefore, in cases where the phosphor sheet 70 constituted of the phosphor represented by the formula Y$_2$O$_2$S:Tb$^{3+}$ is used during the recording of a radiation image, part of energy stored on the stimulable phosphor sheet 10 during its exposure to the X-rays is released by the fluorescence 71. Accordingly, when the radiation image is read out from the stimulable phosphor sheet 10, the range of the amount of light emitted by the stimulable phosphor sheet 10 can be compressed. Particularly, in cases where the phosphor sheet 70 is located closer to the radiation source than the stimulable phosphor sheet is, the phosphor sheet 70 should preferably be constituted of the phosphor represented by the formula Y$_2$O$_2$S:Tb$^{3+}$, which is light and which has a low radiation absorptivity, instead of the phosphor represented by the formula Gd$_2$O$_2$S:Tb$^{3+}$, which is heavy and which has a high radiation absorptivity.

Any of other stimulable phosphors and any of other phosphor producing the fluorescence can be employed with the stimulation wavelength range of the stimulable phosphor and the wavelength of the fluorescence being taken into consideration.

We claim:

1. A radiation image recording method wherein a stimulable phosphor sheet provided with a layer of a stimulable phosphor is exposed to radiation, which carries information about an image, and the image is thereby stored on the stimulable phosphor sheet, said stimulable phosphor exhibiting such properties that, when it is exposed to radiation and is then exposed to stimulating rays, it emits light in proportion to the amount of energy stored thereon during its exposure to the radiation, the radiation image recording method comprising the steps of:
  i) locating a layer of a phosphor such that it faces the layer of said stimulable phosphor, said phosphor exhibiting such properties that, when it is exposed to the radiation, it produces fluorescence having wavelengths falling within the stimulation wavelength range of said stimulable phosphor, and
  ii) thereafter irradiating the radiation to said stimulable phosphor sheet.

2. A radiation image recording method as defined in claim 1 wherein said stimulable phosphor is represented by the formula BaFX:Eu$^{2+}$, wherein X is a halogen.

3. A radiation image recording method as defined in claim 2 wherein said phosphor, which produces the fluorescence, is represented by the formula Gd$_2$O$_2$S:Tb$^{3+}$.

4. A radiation image recording method as defined in claim 2 wherein said phosphor, which produces the fluorescence, is represented by the formula Y$_2$O$_2$S:Tb$^{3+}$.

5. A radiation image recording method as defined in claim 1 wherein said radiation is X-rays.

6. A radiation image recording method as defined in claim 1 wherein said stimulating rays are a laser beam.

7. A stimulable phosphor sheet provided with a layer of a stimulable phosphor which exhibits such properties that, when it is exposed to radiation and is then exposed to stimulating rays, it emits light in proportion to the amount of energy stored thereon during its exposure to the radiation, wherein the improvement comprises the provision of a layer of a phosphor, which is located such that it faces the layer of said stimulable phosphor and which exhibits such properties that, when it is exposed to the radiation, it produces fluorescence having wavelengths falling within the stimulation wavelength range of said stimulable phosphor.

8. A stimulable phosphor sheet as defined in claim 7 wherein said phosphor which produces the fluorescence is dispersed in a binder, which is used to hold said stimulable phosphor on a sheet-like substrate.

9. A stimulable phosphor sheet as defined in claim 7 wherein the layer of said phosphor which produces the fluorescence is formed independently of the stimulable phosphor layer and located so that it is close to or in close contact with the stimulable phosphor layer.

10. A stimulable phosphor sheet as defined in claim 7 wherein said stimulable phosphor is represented by the formula BaFX:Eu$^{2+}$, wherein X is a halogen.

11. A stimulable phosphor sheet as defined in claim 10 wherein said phosphor, which produces the fluorescence, is represented by the formula Gd$_2$O$_2$S:Tb$^{3+}$.

12. A stimulable phosphor sheet as defined in claim 10 wherein said phosphor, which produces the fluorescence, is represented by the formula $Y_2O_2S:Tb^{3+}$.

13. A stimulable phosphor sheet as defined in claim 7 wherein said radiation is X-rays.

14. A stimulable phosphor sheet as defined in claim 7 wherein said stimulating rays are a laser beam.

15. A cassette for housing a stimulable phosphor sheet provided with a layer of a stimulable phosphor which exhibits such properties that, when it is exposed to radiation and is then exposed to stimulating rays, it emits light in proportion to the amount of energy stored thereon during its exposure to the radiation, wherein the improvement comprises the provision of a layer of a phosphor, which is located such that it faces the surface of said stimulable phosphor sheet housed in said cassette, said phosphor exhibiting such properties that, when it is exposed to the radiation, it produces fluorescence having wavelengths falling within the stimulation wavelength range of said stimulable phosphor.

16. A cassette as defined in claim 15 wherein said stimulable phosphor is represented by the formula $BaFX:Eu^{2+}$, wherein X is a halogen 17. A cassette as defined in claim 16 wherein said phosphor, which produces the fluorescence, is represented by the formula $Gd_2O_2S:Tb^{3+}$.

18. A cassette as defined in claim 16 wherein said phosphor, which produces the fluorescence, is represented by the formula $Y_2O_2S:Tb^{3+}$.

19. A cassette as defined in claim 15 wherein said radiation is X-rays.

20. A cassette as defined in claim 15 wherein said stimulating rays are a laser beam.

* * * * *